tes Patent No.: US 7,787,748 B2
(45) Date of Patent: Aug. 31, 2010

(12) United States Patent
Kinoshita et al.

(54) RECORDING AND REPRODUCING APPARATUS, CONTENT REPRODUCING APPARATUS, MAGNETIC DISK DEVICE, AND CONTROL METHOD THEREOF

(75) Inventors: Takayuki Kinoshita, Kanagawa (JP); Hiroshi Oshikawa, Kanagawa (JP); Tetsuya Tamura, Kanagawa (JP); Hiroshi Uchida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1321 days.

(21) Appl. No.: 10/724,913

(22) Filed: Dec. 1, 2003

(65) Prior Publication Data

US 2004/0184789 A1    Sep. 23, 2004

(30) Foreign Application Priority Data

Dec. 2, 2002    (JP)    ............................. 2002-350420

(51) Int. Cl.
*H04N 5/91*  (2006.01)
*H04N 5/00*  (2006.01)

(52) U.S. Cl. ............................. 386/69; 386/68; 386/70; 386/125

(58) Field of Classification Search ................. 386/112, 386/68, 69, 70, 82, 125, 126; 360/72.1
See application file for complete search history.

(56) References Cited

U.S. PATENT DOCUMENTS

| 5,953,483 | A | 9/1999 | Van Gestel et al. |
| 6,219,198 | B1 * | 4/2001 | Dobbek et al. ........... 360/78.04 |
| 7,003,711 | B2 * | 2/2006 | Noda et al. .................. 714/755 |
| 7,206,496 | B2 * | 4/2007 | Morohoshi et al. ............ 386/68 |
| 7,212,727 | B2 * | 5/2007 | Senoh .......................... 386/68 |
| 2001/0017974 | A1 * | 8/2001 | Oue ............................. 386/69 |
| 2002/0178453 | A1 * | 11/2002 | Jun et al. ....................... 725/88 |
| 2003/0004948 | A1 * | 1/2003 | Bohrer et al. .................. 707/10 |

FOREIGN PATENT DOCUMENTS

JP    2001-103424    4/2001

* cited by examiner

*Primary Examiner*—Thai Tran
*Assistant Examiner*—Hung Q Dang

(57) ABSTRACT

A head position estimator estimates the present position of a head relative to a recording medium, an LBA calculator for calculating positions of a data block to be read next and other data blocks existing before and after the data block, and a moving destination determiner for determining a data block at which the time required to move the head is the shortest, as a data block to be read next, on the basis of the present position of the head, which has been estimated by the head position estimator, and the positions of the respective data blocks, which have been calculated by the LBA calculator.

8 Claims, 7 Drawing Sheets

RECORDING AND REPRODUCING APPARATUS, CONTENT REPRODUCING APPARATUS, MAGNETIC DISK DEVICE, AND CONTROL METHOD THEREOF

RELATED PATENT APPLICATION

This application claims priority to Japanese Patent Application No. JP2002-350420 (Hitachi Global Storage Technologies Docket No. JP920020209US1), filed on Dec. 2, 2002, and entitled "Recording and Reproducing Apparatus, Content Reproducing Apparatus, Magnetic Disk Device, and Control Method Thereof."

BACKGROUND OF THE INVENTION

1. Technical Field

The present invention relates to control for reading data at the reproduction of digital contents such as moving pictures recorded in a disk-shaped recording medium such as a magnetic disk.

2. Description of the Related Art

With an increase in memory capacity of a magnetic disk, a PVR (Personal Video Recorder) corresponding to a digital video recorder using the magnetic disk as a recording medium is now becoming pervasive. The PVR normally makes use of an MPEG2 (Moving Picture Experts Group 2) as a recording system. Motion data can be grasped as a set of screen data of still images (frames) arranged on a time sequence basis.

FIG. 8 is a diagram showing a data structure of the MPEG2. In the MPEG2, as shown in FIG. 8, data is managed by GOP (Group of Pictures: encoding unit employed in the MPEG2) added with a sequence header (SH) (sequence layer). Each GOP is described by three types of screen data of I, P and B frames. The GOP is normally made up of one I frame and a plurality of P frames and B frames (GOP layer). Of these, the I frame represents screen data described by compressing a frame corresponding to one screen as it is, and the P frame and B frame respectively represent screen data descriptive of differences between the P and B frames and other frames. Thus, the I frame is independent as a still picture. The screen for the corresponding I frame can be reproduced by reading only the screen data of the I frame. On the other hand, since the P frame and B frame depend on the screen data of the other frames, the screens for the corresponding frames cannot be reproduced by reading only the screen data of the P and B frames.

When motion data is reproduced, screen data of respective frames are sequentially reproduced according to a time sequence upon normal reproduction. However, only I frames are reproduced while being read skippingly in the case of special reproduction such as fast-forward reproduction, fast-reverse reproduction, or the like. When, for example, the fast-forward reproduction is done at 30 times speed, I frames are read and reproduced at a rate of one per 30 I frames.

Since the motion data is recorded continuously with respect to the track direction (circumferential direction) of the magnetic disk in the PVR, the data is sequentially read in the case of the normal reproduction or playback. On the other hand, when the special reproduction for reading the data while skipping it as described above is performed, data to be read are scattered in the circumferential direction of the magnetic disk. Therefore, this results in a state similar to a random access for reading and writing the data from and in a data area of the magnetic disk at random.

SUMMARY OF THE INVENTION

When the data recorded continuously in the track direction of the magnetic disk are read while skipping them as described above, the data to be read are scattered in the circumferential direction of the magnetic disk. Therefore, a seek time (corresponding to the time required to move a head for reading data to thereby position it to a desired track (cylinder)) taken to move the head to a desired LBA (Logical Block Address), and a rotation latency (corresponding to the time required to rotate the magnetic disk so as to cause the desired LBA to reach the position of the head) of the magnetic disk occur. The seek time and the rotation latency will hereinafter be called a mechanical latency together.

Since the reading/writing of data is performed while the head is being sequentially moved to adjacent tracks (cylinders) in the PVR, the direction of movement of the head is one direction and the seek distance is also short. Therefore, the seek time at the reproduction is small, thus presenting no problem. However, the rotation latency exerts a great influence on the transfer rate of data. That is, the average of rotation latencies is one-half the rotation time of the magnetic disk. In the case of an HDD (Hard Disk Drive) of 5400 rpm (round per minute), for example, it results in about 5.6 ms (milli-second). Accordingly, the transfer rate of data is significantly reduced as compared with at the normal reproduction, thus leading to disturbance in image.

Increasing the number of revolutions (rpm) of the HDD is considered as such a simple means for preventing a reduction in the transfer rate of the data due to the rotation latency. Increasing the rotational speed of the magnetic disk makes it possible to reduce the rotation latency and improve the performance.

Since, however, the HDD high in rpm is large in operation sound, it is not adequate to the PVR. It is also undesirable that the heat generated and power consumption increases, and the cost for parts also increases.

In an HDD that serves as an external storage apparatus used in data processing executed by a computer, a technique called command queue reordering is known as a means for preventing a reduction in the transfer rate of data due to a rotation latency. This is one for collecting a plurality of commands and optimizing the sequence of execution of them to thereby decrease a latency time necessary till the command execution and improve the performance of random access.

Since, however, the data (frames) are arranged on a time sequence basis in the HDD used by the PVR, it is not desirable to change the sequence of execution of the commands. The command queue reordering is unfit for the PVR.

Incidentally, as a problem similar to the above, may be mentioned, a problem common to a reproducing apparatus that reproduces digital contents such as moving pictures recorded in disk-shaped recording mediums such as optical disks like a DVD (Digital Versatile Disk), a CD (Compact Disk) in addition to the PVR using the magnetic disk as the recording medium.

Therefore, the present invention aims to lessen a reduction in the transfer rate of data due to a mechanical latency including a rotation latency of a disk-shaped recording medium upon reading data recorded in the recording medium.

In order to achieve the above object, the present invention is implemented as a recording and reproducing apparatus comprising an encode unit that inputs and encodes predetermined stream data, a data storage unit that writes the data encoded by the encode unit on a magnetic disk and reads the data written on the magnetic disk, and a decode unit that decodes the data read from the magnetic disk by the data storage unit. In the recording and reproducing apparatus, the data storage unit is characterized by, in a predetermined case, reading other data existing before or after data to be read for decoding the data, in place of the data to be read therefor. Namely, this is done where a time required to move a magnetic head to a position of the other data is shorter than a time required to move the magnetic head to a position of the data to be read. A travel time of such a magnetic head is determined based on a seek time required for the magnetic head to seek a track having predetermined data existing thereon, and a rotation latency necessary for the magnetic head to move on the track and then for the magnetic disk to rotate to thereby cause the desired data to reach a position of the magnetic head.

Also the present invention is realized as another recording and reproducing apparatus provided with an encode unit, a data storage unit and a decode unit similar to the above. In the recording and reproducing apparatus, the storage unit is characterized in that when content is fast-forward reproduced or fast-reverse reproduced, data read by the fast-forward reproduction or the fast-reverse reproduction is shifted forward or backward such that a rotation latency of the magnetic disk is shortened.

Here, the shifting of the data to be read means that when a rotation latency required to read other data existing before or after data to be read by a magnetic head upon the fast-forward reproduction or the fast-reverse reproduction is shorter than a rotation latency required for the magnetic head to read the data thereupon, such other data is read.

Further, the present invention is implemented even as a recording and reproducing apparatus (PVR) configured in the following manner. Namely, the recording and reproducing apparatus comprises an encode unit that inputs a video signal, converts the same into digital data and encodes the converted digital data, a data storage unit that writes the data encoded by the encode unit on a magnetic disk and reads the data written on the magnetic disk, a decode unit that decodes the data read from the magnetic disk and outputs the data as a video signal, and a controller that controls the operations of these encode unit, data storage unit and decode unit and reads other data existing before or after data for reproducing the video signal, which is to be read from the magnetic disk, in place of the data to be read upon reading the data for reproducing the video signal therefrom.

Another present invention for achieving the above object is implemented even as a content reproducing apparatus configured in the following manner, for reading and reproducing a digital content recorded in a disk-shaped recording medium. That is, the content reproducing apparatus comprises head position estimating means for estimating the present position with respect to the recording medium, of a head, data position calculating means for calculating a position of a data block for a digital content to be read next, and positions of other data blocks existing before and after the data block, and moving destination determining means for determining a data block at which the time (which includes a rotation latency taken until a desired data block reaches the position of the head according to the rotation of the recording medium) required to move the head is the shortest, as a data block to be read next, based on the present position of the head, which has been estimated by the head position estimating means, and the positions of the respective data blocks, which have been calculated by the data position calculating means. Upon estimating the head position, the time taken to execute a command for reading the corresponding data block is measured and the obtained result of measurement can be reflected on its estimation.

A further present invention for achieving the above object is realized even as a magnetic disk device provided with a magnetic disk, a magnetic head, and a controller for controlling the movement of the magnetic head to thereby cause the magnetic head to read and write data from and on a desired position of the magnetic disk. In the magnetic disk device, the controller is characterized by in place of a data block to be read, which has been specified by a logical block address, causing the magnetic head to read other data block existing before or after the data block as necessary. Namely, the reading of other data block is performed where the time required to move the magnetic head to a position of other data block is shorter than the time required to move the magnetic head to a position of the data block to be read. More specifically, the controller estimates a position of the magnetic head with respect to the magnetic disk by a physical block address in a data recording area of the magnetic disk, and calculates the time required to move the magnetic head to each data block, based on each of physical block addresses indicative of the positions of the respective data blocks and the position of the magnetic head. Upon estimating the position of the magnetic head, the time taken to execute a command for reading the corresponding data block is measured and the obtained result of measurement can be reflected on its estimation.

Further, the present invention is implemented even as a method of controlling the following content reproducing apparatus for reading and reproducing a digital content recorded in a disk-shaped recording medium. Namely, the method comprises a step for estimating the present position with respect to the recording medium, of a head for reading the digital content, a step for calculating a position of a data block for the digital content to be read next, and positions of other data blocks existing before and after the data block, a step for calculating a time required to move the head, based on the estimated present position of head and the positions of the respective data blocks, and a step for reading a data block at which the calculated time (this time includes a rotation latency taken until a desired data block reaches the position of the head by the rotation of the recording medium) required to move the head is the shortest.

Furthermore, the present invention is realized even as a method of controlling a content reproducing apparatus including a step for, when a digital content is fast-forward reproduced or fast-reverse reproduced, reading data before or after data to be read by the fast-forward reproduction or the fast-reverse reproduction so as to minimize a rotation latency of a magnetic disk, and a step for decoding the read data and reproducing the digital content.

Still further, the present invention can be implemented even as a program for controlling a computer and thereby realizing the method for controlling the content reproducing apparatus.

DETAILED DESCRIPTION OF THE INVENTION

The present invention will hereinafter be described in detail based on an embodiment illustrated in the accompanying drawings. In the present embodiment, a PVR (Personal Video Recorder) that records and reproduces motion data, using a magnetic disk as a recording medium, will be explained by way of example. In the present embodiment as well, the MPEG 2 will be used in encoding of motion data.

Figure 1:
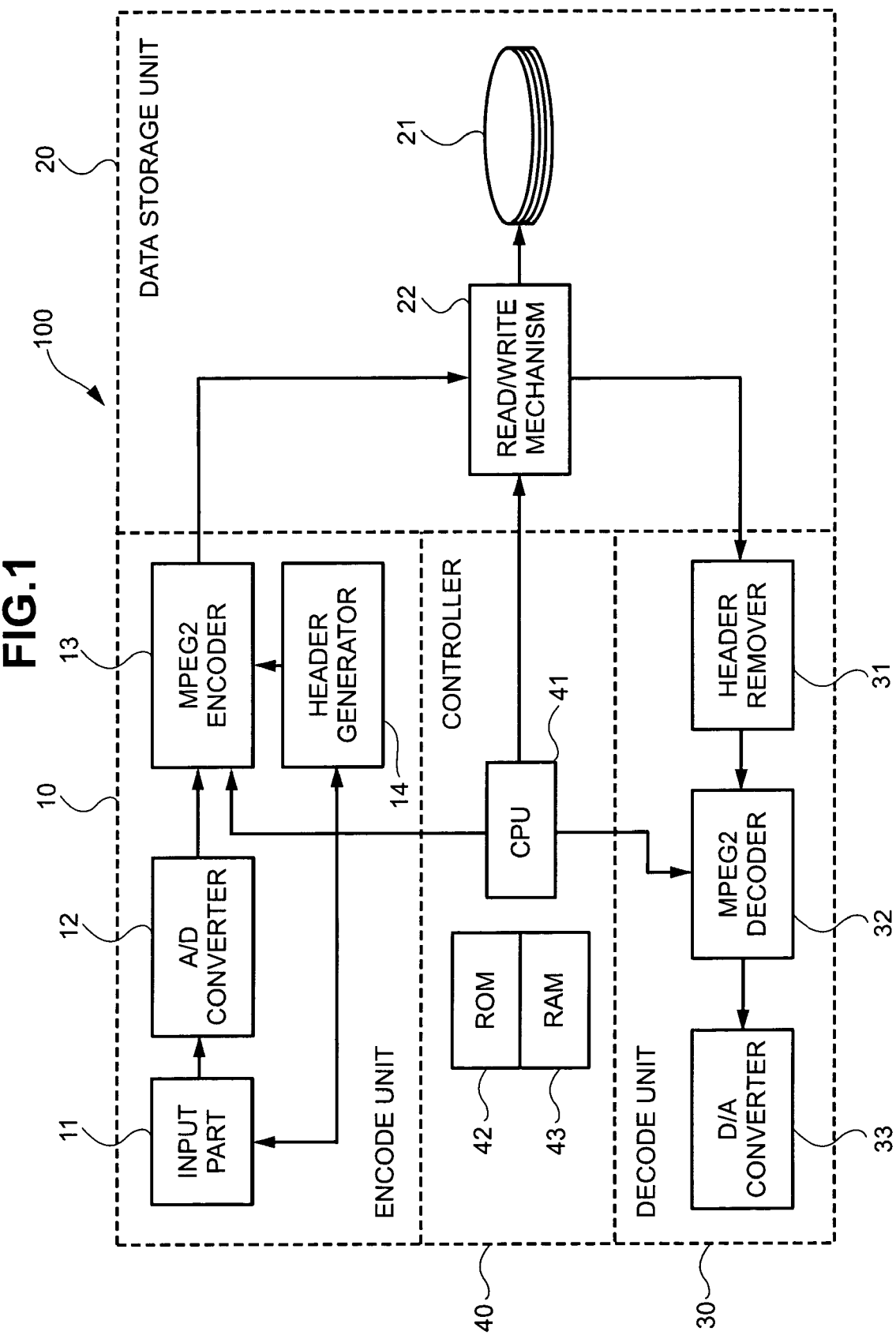
FIG. 1 is a block diagram showing the configuration of a major part of a recording and reproducing apparatus (PVR) according to the present embodiment.

FIG. 1 is a block diagram showing the configuration of a major part of a recording and reproducing apparatus (PVR) 100 according to the present embodiment. The recording and reproducing apparatus 100 comprises an encode unit 10 for inputting and encoding a video or picture signal representing a moving picture to thereby generate motion data, a data storage unit 20 for storing the motion data generated by the encode unit 10, a decode unit 30 for reading and decoding the motion data stored in the data storage unit 20 and outputting the decoded data, and a controller 40 for controlling the operations of these respective parts.

As shown in FIG. 1, the encode unit 10 includes an input part 11 for inputting a video signal, an A/D (Analog/Digital) converter 12 for converting the input vide signal (input signal) from an analog signal to a digital signal, an MPEG2 encoder 13 for encoding the digital-converted input signal by an MPEG2 scheme, and a header generator 14 for generating a sequence header (GOP header) added to the encoded motion data.

The input part 11 receives a television broadcast via an antenna and a tuner and inputs a video signal through a video input terminal to thereby input a picture signal intended for recording. The input picture signal is converted into a digital signal by the A/D converter 12, which in turn is encoded by the MPEG2 encoder 13. In parallel with it, a sequence header is generated by the header generator 14. The encoded motion data and the generated sequence header are coupled to each other, followed by transmission to the data storage unit 20 (unless distinguished in particular, the motion data with the sequence header will hereinafter be called simply motion data).

The data storage unit 20 is an HDD (Hard Disk Drive) and has a magnetic disk 21 used as a recording medium, and a read/write mechanism 22 that reads and writes data from and on the magnetic disk 21.

Figure 2:
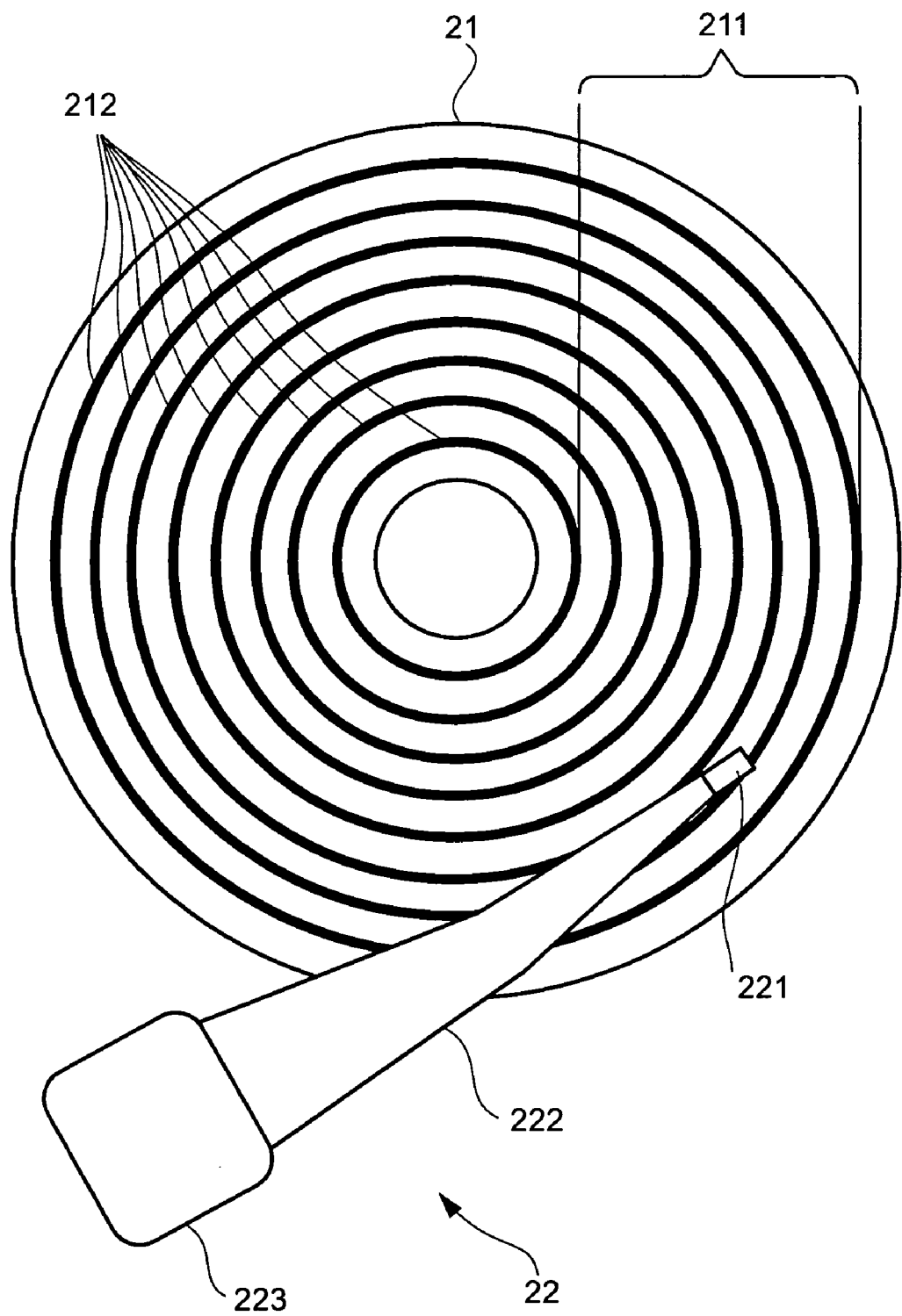
FIG. 2 is a diagram schematically illustrating the configuration of a data storage unit employed in the present embodiment.

FIG. 2 is a diagram schematically showing the configuration of the data storage unit 20. The magnetic disk 21 is provided with a data recording area 211 formed on a disk-shaped surface. Information is magnetically recorded on the data recording area 211. The data recording area constitutes concentric tracks 212, and data is read from and written on the tracks 212. Incidentally, the HDD normally has a plurality of sheets of magnetic disks 21 with their discal center axes being coincident with each other. The same tracks 212 of the respective magnetic disks 21 will be collectively called a cylinder. The concepts of the tracks 212 will be defined so as to include not only a single track 212 of a single magnetic disk 21 but also a cylinder.

The read/write mechanism 22 is provided with a magnetic head 221 for magnetically reading and writing data from and on the tracks 212 of the magnetic disk 21, an actuator 222 for supporting the magnetic head 221, and a voice coil motor (VCM: Voice Coil Motor) 223 for rotatably controlling the actuator 222 to shift or move it to the desired track of the magnetic disk 21. Although not illustrated in the figure, the read/write mechanism 22 also includes a spindle motor for rotatably driving the magnetic disk 21, a read/write channel for executing writing and reading of data by the magnetic head 221, a microcomputer for controlling operations of respective parts, etc.

Motion data sent from the encode unit 10 to the data storage unit 20 is recorded on the corresponding magnetic disk 21 as magnetic information by the read/write mechanism 22. Based on a request from the decode unit 30, predetermined motion data is read from the magnetic disk 21 by the read/write mechanism 22 and sent back to the decode unit 30.

The decode unit 30 includes a header remover 31 for removing a sequence header from the motion data sent from the data storage unit 20, an MPEG2 decoder 32 for decoding the motion data from which the sequence header has been removed, to thereby reproduce a picture signal, and a D/A (Digital/Analog) converter 33 for converting the reproduced picture signal from a digital signal to an analog signal.

By virtue of the header remover 31, the sequence header is removed from the motion data read from the corresponding magnetic disk 21 by the read/write mechanism 22. The motion data is decoded by the MPEG2 decoder 32 and converted into an analog video or picture signal by the D/A converter 33, followed by its output therefrom. Then the video signal is displayed on a television set or the like as motion pictures.

The controller 40 is provided with a CPU (Central Processing Unit) 41, and a ROM (Read Only Memory) 42 and a RAM (Random Access Memory) 43 for storing a program for controlling the operation of the CPU 41, parameters or the like used in the processing of the CPU 41. The controller 40 controls the operations of the respective parts, such as encoding, writing, reading and decoding of motion data, generation of a sequence header, its removal, etc.

Today, access to the HDD is generally performed by designating an LBA. On the other hand, the position of each actual data in the data recording area 211 of the magnetic disk 21 is managed by a PBA (Physical Block Address) specified by three sets of a cylinder number, a servo/sector number and a head number. In response to an access request made by designating the LBA, a microcomputer of the HDD converts the LBA to its corresponding PBA to control the read/write mechanism 22, thereby executing reading/writing of data.

The present embodiment is intended not to simply read data of an I frame specified by the LBA but to read the data of the I frame (i.e., shift an I frame intended for reading) such that PBAs of data corresponding to the I frame and I frames placed before and after the I frame are taken into consideration and a rotation latency of the magnetic disk 21 is most shortened.

Incidentally, while the PBA is specified by the three sets of cylinder, servo/sector and head numbers as described above, the head numbers are used for specifying the plurality of magnetic disks 21 and the data recording areas 211 respectively formed on the two surfaces of the respective magnetic disks 21 by the numbers of their corresponding magnetic heads 221. Accordingly, only the cylinder and servo/sector numbers will be handled in the following description in the interests of simplicity.

Figure 3:
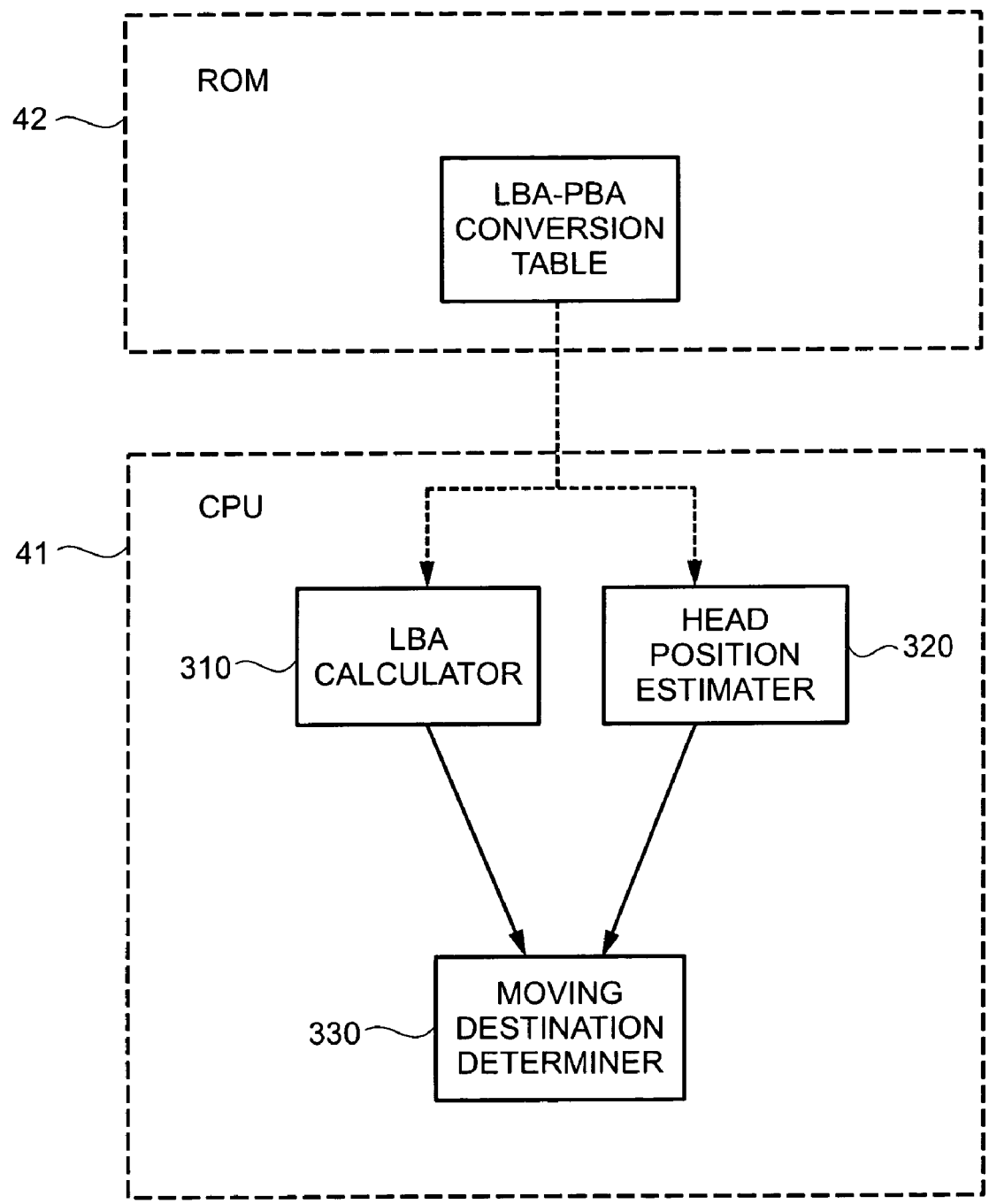
FIG. 3 is a diagram showing function blocks for operation control at the special reproduction of motion data by the recording and reproducing apparatus according to the present embodiment.

FIG. 3 is a diagram showing function blocks for operation control at the special reproduction of motion data by the recording and reproducing apparatus 100 according to the present embodiment.

Referring to FIG. 3, the present embodiment has, as control functions at the special reproduction, an LBA calculator 310 for calculating an LAB of data of an I frame to be read next from the corresponding magnetic disk 21, a head position estimater 320 for estimating the present position of the magnetic head 221 with respect to the data recording area 211 of the magnetic disk 21, and a moving destination determiner 330 for calculating the time required to move the magnetic head 221 from the estimated present position to the position of data of an I frame to be read next to thereby determine a moving destination of the magnetic head 221.

These functions are implemented by the program-controlled CPU 41 of the controller 40. A program for controlling the CPU 41 is stored in the ROM 42, for example. Also, these functions may be implemented as functions of a microcomputer of the data storage unit 20, rather than implemented by the controller 40 used as control means of the recording and reproducing apparatus 100.

The LBA calculator 310 calculates an LBA of data of an I frame to be read next upon special reproduction. The calculation of each LBA varies according to what special reproduction is done. Namely, the positions (LBAs) of respective I frames of motion data can be obtained by operating the whole motion data upon recording or on an initial basis, or according to a rule or the like for motion data in which an I frame always exists immediately after a sequence header. However, I frames to be read vary according to the type of special reproduction such as fast-forward reproduction, fast-reverse reproduction or at what speed fast-forwarding is done. If the fast-forward reproduction is performed at a 30× speed, for example, I frames are read while skipping them, at a rate of one per 30 I frames. If read at a 60× speed, then I frames are read at a rate of one per 60 I frames. Thus, an LBA for data of an I frame to be read next is calculated based on the GOP, the data size of each individual frame and the type of special reproduction.

Also the LBA calculator 310 calculates even LBAs for data of I frames existing before and after the I frame to be read next upon the above-described special reproduction, together with the I frame. The I frame to be read next upon the special reproduction and the I frames (plural I frames whose LBAs have been calculated) existing before and after the I frame will be called moving-destination candidate I frames.

The head position estimater 320 estimates the present position of the magnetic head 221 relative to the data recording area 211 of the corresponding magnetic disk 21. The position of the magnetic head 221 is specified by its corresponding PBA. Since an error occurs between the time required to complete the reading of data from the magnetic disk 21 and the time required to terminate the transfer of read motion data to the decode unit 30, the position estimation of the magnetic head 221 is performed in the following manner:

(1) A PBA corresponding to an LBA of the last data read by a most-recently executed command is first determined.

Figure 5:
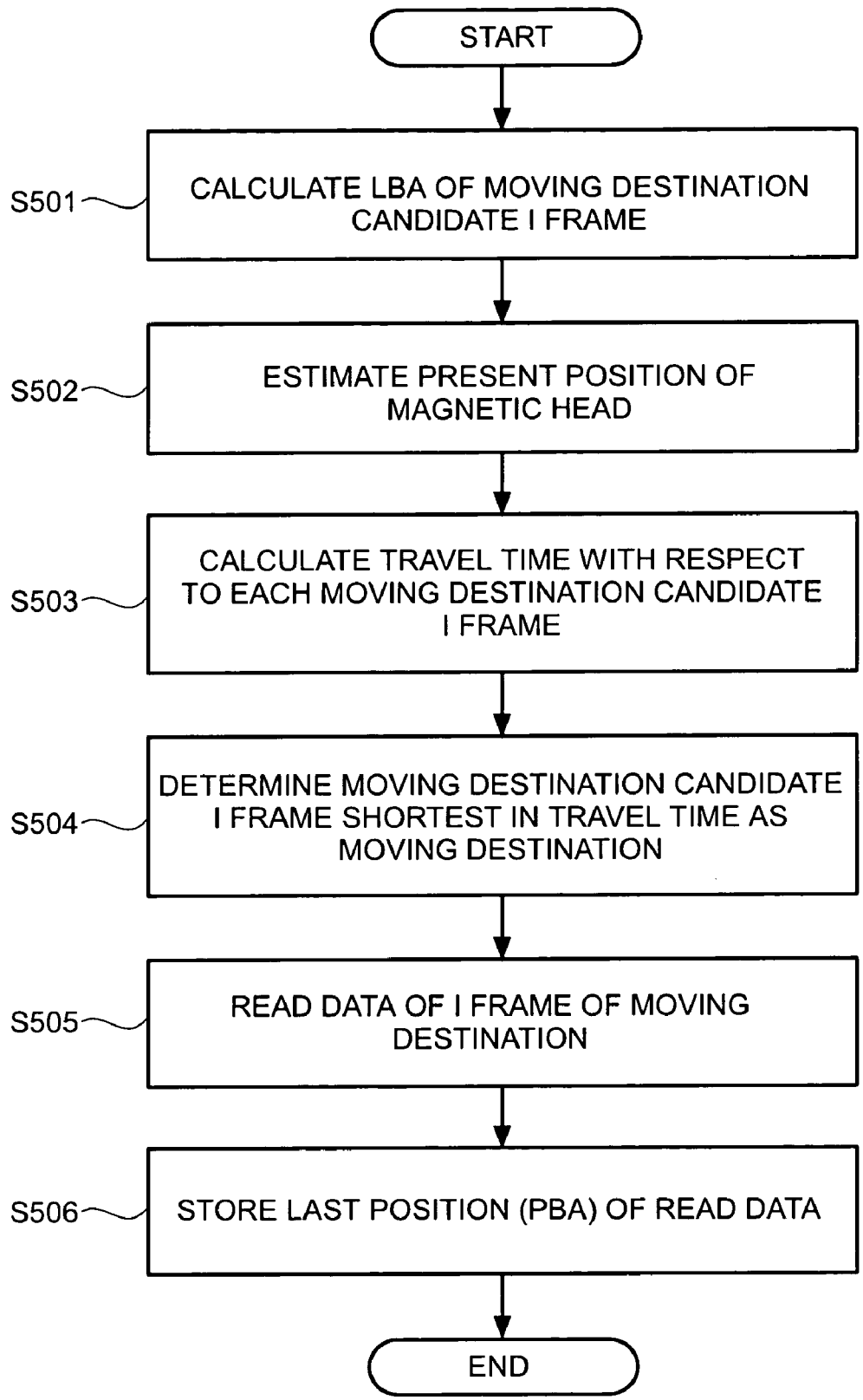
FIG. 5 is a flowchart for describing the flow of control operations at the special reproduction, of the recording and reproducing apparatus according to the present embodiment.

(2) Next, a predetermined constant determined according to the type of special reproduction (e.g., fast-forward speed) is added to a servo/sector number of the PBA obtained in (1). This constant can be decided by such control as to measure the time taken from the issuance of a command to the end of its reading each time one frame is invoked (i.e., the operation shown in FIG. 5 is repeated), and increase or decrease it such that variations in time are reduced. If a value obtained by adding the constant to the servo/sector number exceeds the number of servo sectors per track, then the magnetic disk 21 turns one rotation or more. Therefore, a residue divided by the number of the sectors per track is used as a new servo/sector number.

Incidentally, the acquisition of the PBA in (1) is performed using a previously prepared conversion table of PBAs and LBAs, and a computational equation for determining PBAs from LBAs. The conversion table and the equation may be stored in the ROM 42 of the controller 40 upon production of the recording and reproducing apparatus 100, for example. Alternatively, they are recorded on the corresponding magnetic disk 21 of the data storage unit 20 and may be read upon startup of the recording and reproducing apparatus 100 or if necessary.

The present position of the magnetic head 221, which has been determined in the above-described manner, is defined as follows:

PBA1=(cylinder1,ss1)

Incidentally, cylinder1 indicates a cylinder number, and ss1 indicates a servo/sector number. The moving destination determiner 330 calculates the time required to move the magnetic head 221 form the present position of the magnetic head 221, which has been estimated by the head position estimater 320, to a data position of the moving destination candidate I frame whose LBA has been calculated by the LBA calculator 310, and determines the corresponding moving destination of the magnetic head 221, based on the result of calculation.

Figure 4:
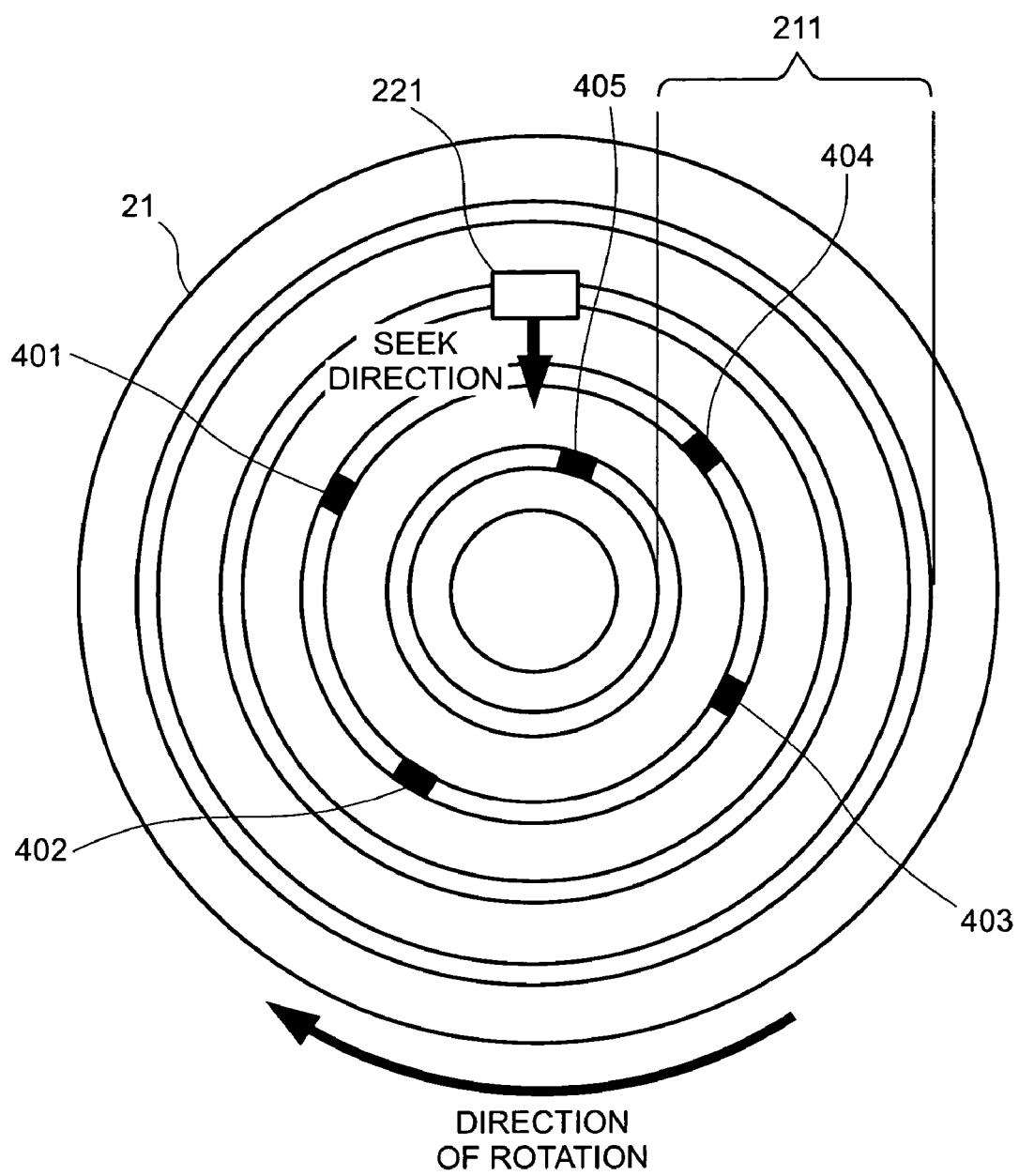
FIG. 4 is a diagram for describing moving destinations of a magnetic head, which are determined by a moving destination determiner employed in the present embodiment.

FIG. 4 is a diagram for describing moving destinations of the magnetic head 221, which are determined by the moving destination determiner 330. In FIG. 4, I frames 401 through 405 are moving destination candidate I frames. Of these, the I frame 403 is an I frame to be read next, which is determined according to the type of special reproduction. LBAs have been calculated with respect to the I frames (401, 402, 404 and 405) placed by two before and after the I frame 403. The magnetic head 221 is located at a PBA1.

Referring to FIG. 4, the moving destination candidate I frames 401 through 405 are circumferentially spread in the data recording area 211 of the magnetic disk 21. Thus, in FIG. 4, for example, the immediately preceding moving destination candidate I frame 402 rather than the moving destination candidate I frame 403 to be read next upon the special reproduction can be early read.

As can be understood from the fact that in the case of motion data, screen data of a predetermined frame is represented by the difference between the screen data and screen data of another frame to thereby perform data compression, the meaning of an image or picture remains so unchanged in most cases even if frames placed in positions close to the back and forth of a desired frame are reproduced in place of the desired frame.

Therefore, the I frame that enables the magnetic head 221 to be moved earliest, of the moving destination candidates I frames 401 through 405, will be intended for reading.

In order to realize it, the moving destination determiner 330 calculates the time (seek time+rotation latency: hereinafter called simply travel time) required to move the magnetic head 221 from the PBA1 with respect to each of the moving destination candidates I frames 401 through 405 shown in FIG. 4. A data position of the moving destination candidate I frame at which the calculated travel time is the smallest, is determined as the moving destination of the magnetic head 221. The travel time with respect to each of the moving destination candidates I frames 401 through 405 is calculated in the following manner.

(1) PBAs are first determined from LBAs of the moving destination candidates I frames 401 through 405, which have been calculated by the LBA calculator 310. They are defined as follows:

$$PBA2 = (cylinder2, ss2)$$

Incidentally, cylinder2 indicates a cylinder number, and ss2 indicates a servo/sector number. The conversion table or equation used to estimate each position of the magnetic head 221 can be used to obtain the PBA2.

(2) Next, the travel time taken to move the magnetic head from the PBA1 to PBA2 is calculated by using the following equation individually with respect to the respective moving destination candidates I frames 401 through 405.

```
Travel time = {
delta_t = rotation_time/number_of_sector;
rotation_latency = (ss2-ss1) * delta_t;
while (rotation_latency < f(|cylinder1-cylinder2|)){
rotation_latency = rotation_latency + rotation_time};
return (rotation_latency)
}
```

In the above equation, f(t) is a seek profile function, which is a function for providing the time necessary for the magnetic head 221 to move on t cylinders. The delta_t indicates the time required to read data corresponding to one sector, the rotation_time indicates the time necessary for the magnetic disk to rotate one, the number_of sector indicates the number of sectors on the tracks 212, and the roration_latency indicates the time (rotation latency) necessary for the magnetic head to move from ss1 to a position ss2 of intended data (data of moving destination candidate I frame) under the rotation of the magnetic disk.

After the moving destination of the magnetic head 221 has been determined in the above-described manner, the controller 40 moves the magnetic head 221 to the determined moving destination and issues a read command for reading a data block, as a normal control operation. Thus, it is feasible to shorten the rotation latency to the fullest and read the I frame rather than to simply read an I frame to be read, which is determined according to the type of special reproduction.

Incidentally, when data of an I frame at the determined moving destination is read, the controller 40 stores the last position (PBA) of the read data in the RAM 43 or the like. The last position of the stored data is utilized to estimate the present position of the magnetic head 221 upon issuance of the next read command.

FIG. 5 is a flowchart for describing the flow of control operations at the special reproduction, of the recording and reproducing apparatus 100 according to the present embodiment, which has been configured in the above-described manner.

As shown in FIG. 5, an LBA of a moving destination candidate I frame is first calculated by the LBA calculator 310 (Step 501). Then the present position of the magnetic head 221 is estimated by the head position estimator 320 (Step 502).

Next, the time required for the magnetic head to travel to each moving destination candidate I frame is calculated by the moving destination determiner 330 (Step 503). The moving destination candidate I frame having the shortest travel time is determined as a moving destination, i.e., an I frame intended for reading (Step 504).

Next, a read command intended for data of the moving destination I frame determined at Step 504 is issued according to a command issuing function of the controller 40, and the corresponding data is read (Step 505). When the data storage unit 20 gives a notice (DRDY bit where the interface of the data storage unit (HDD) 20 is of an ATA (ATA attachment)) of the end of reading to the controller 40, the last position (PBA) of the data is stored in the RAM 43 (Step 506). The read data of I frame is decoded by the decode unit 30, which in turn is displayed on the television set or the like.

The operation shown in FIG. 5 corresponds to control for reading the data of one I frame at the special reproduction. During execution of the special reproduction, this operation is repeated.

A control example at the special reproduction according to the present embodiment will next be explained in a show of specific numerical values.

Figure 6:
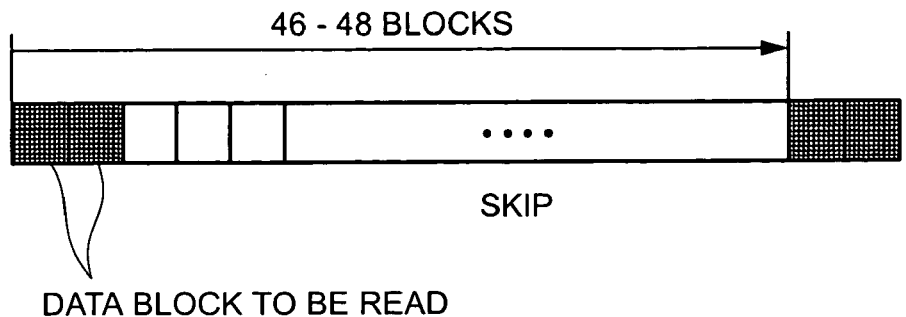
FIG. 6 is a diagram showing an access pattern to a magnetic disk where 60×-speed fast-forward reproduction has been performed in the recording and reproducing apparatus.

FIG. 6 is a diagram showing an access pattern to the magnetic disk 21 where 60×-speed fast-forward reproduction has been performed in the recording and reproducing apparatus 100. In the example illustrated in FIG. 6, two blocks are read every 46 through 48 blocks (logical blocks) when the fast-forward reproduction is performed at a 60× speed (one block: 128 KBytes). A data transfer rate at this time is represented as 2 MBytes/second, and the speed of rotation of the magnetic disk 21 is represented as 5400 rpm (11.1 ms per round).

Figure 7:
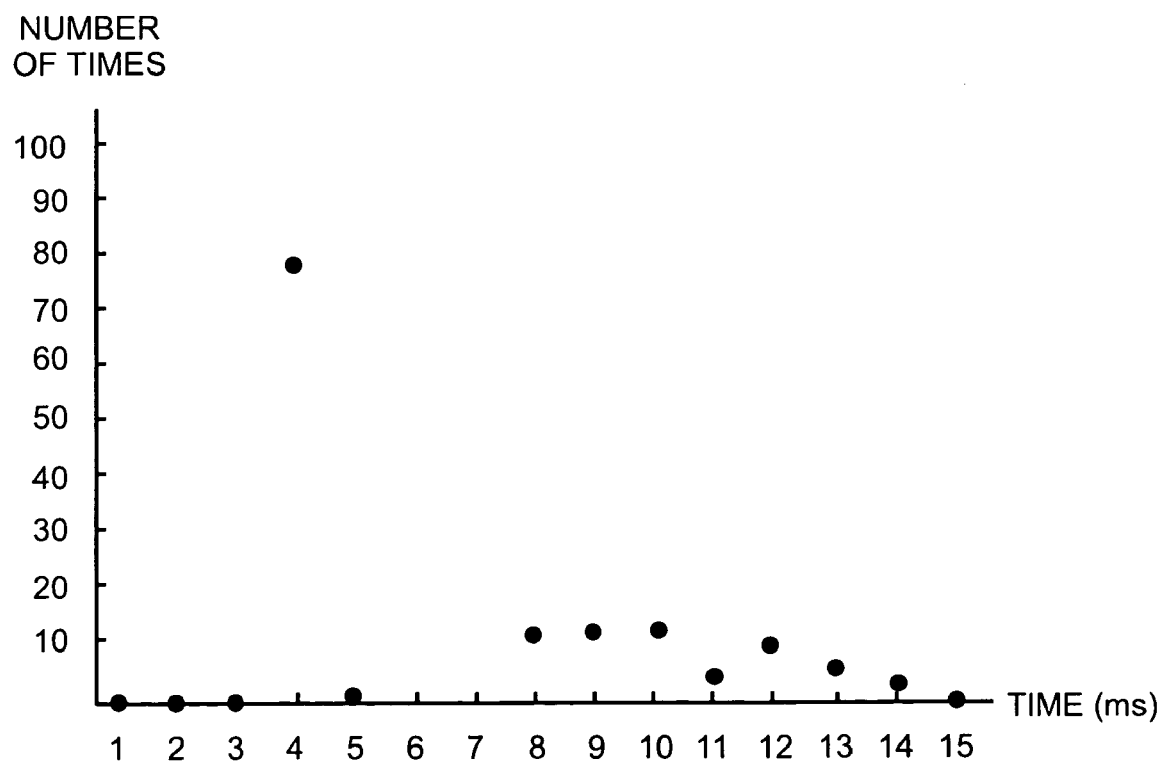
FIG. 7 is a diagram illustrating a distribution of time taken from the issuance of a read command to the end of reading in the case shown in FIG. 6.
Figure 8:
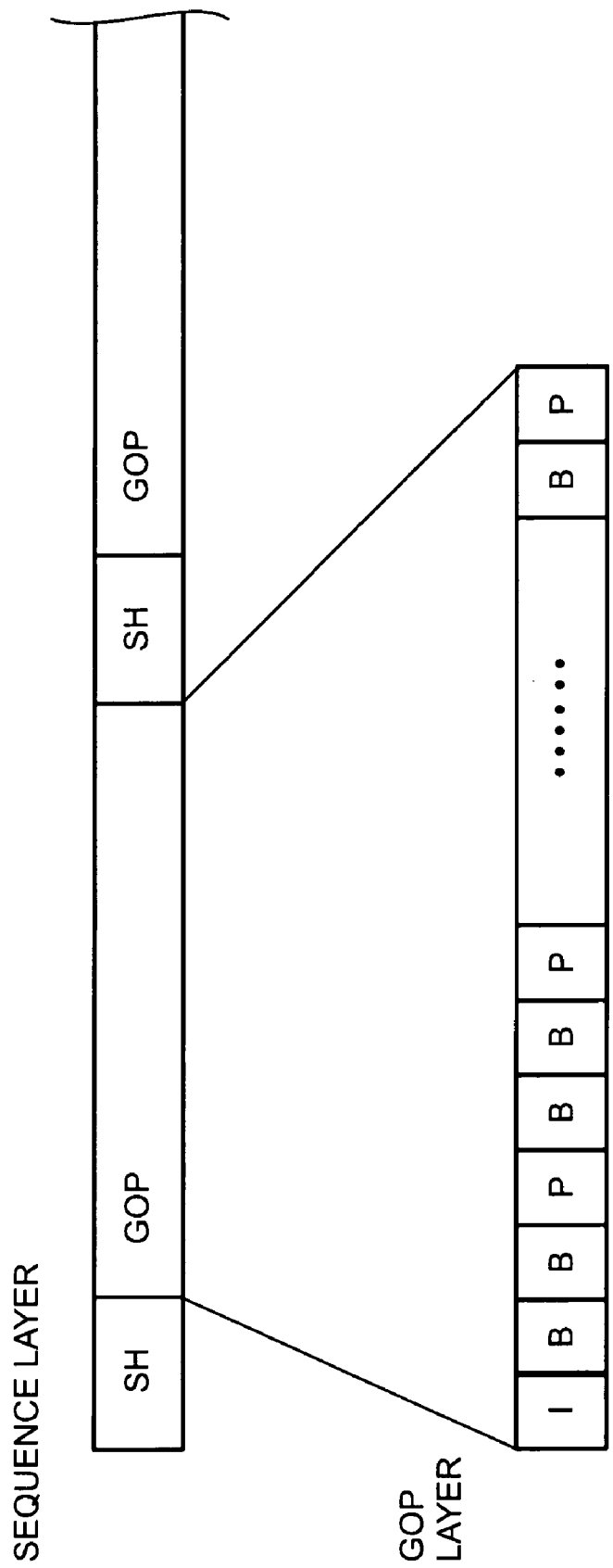
FIG. 8 is a diagram showing a data structure at the MPEG2.

FIG. 7 is a diagram showing a distribution of time taken from the issuance of a read command to the rise of a DRDY bit (the end of reading) in the above case. Referring to FIG. 7, the frequency of its occurrence is extremely high when the time is 4 ms. This corresponds to the time required to read a second block where data is read every two blocks as shown in FIG. 6. Therefore, if it is excepted, no large difference occurs between occurrence frequencies at 5 ms through 15 ms. Assuming that the time required to read data is given as 4 ms and the remaining time is given as a rotation latency, the time results in 0 ms to 11 ms. Therefore, it matches with the number of revolutions of the magnetic disk 21 referred to above.

Let's consider that the present embodiment is applied to shorten the rotation latency. Assume that the heads of data containing I frames are scattered in the circumferential direction within the data recording area 211 of the magnetic disk 21. Moving destination candidates I frames are to be defined as an I frame included in data blocks advanced 46 through 48 blocks shown in FIG. 6, and I frames placed N by N before and after the I frame. That is, let's assume that the I frame to be read can be shifted by N before and after the I frame. In doing so, the average of rotation latencies is shortened to $1/(2N+1)$.

Thus, assuming that a data transfer amount at one transfer is 128 KB (KBytes), the transfer rate of data is represented as below when the present embodiment is not applied:

$$128 \text{ KB}/(4 \text{ ms} + 5.6 \text{ ms}) = 13.4 \text{ MB/s}$$

On the other hand, when the present embodiment is applied as N=1, the data transfer rate is as follows:

$$128 \text{ KB}/(4 \text{ ms} + (5.6/(2N+1)) \text{ ms}) = 21.9 \text{ MB/s}$$

When the present embodiment is applied as N=2, the data transfer rate is as follows:

$$128 \text{ KB}/(4 \text{ ms} + (5.6/(2N+1)) \text{ ms}) = 25.0 \text{ MB/s}$$

Namely, a 62% performance improvement can be anticipated when N=1, whereas when N=2, an 87% performance improvement can be expected.

$$128 \text{ KB}/(4 \text{ ms}+5.6 \text{ ms})=13.4 \text{ MB/s}$$

On the other hand, when the present embodiment is applied as N=1, the data transfer rate is as follows:

$$128 \text{ KB}/(4 \text{ ms}+(5.6/(2N+1))\text{ms})=21.9 \text{ MB/s}$$

When the present embodiment is applied as N=2, the data transfer rate is as follows:

$$128 \text{ KB}/(4 \text{ ms}+(5.6/(2N+1))\text{ms})=25.0 \text{ MB/s}$$

Namely, a 62% performance improvement can be anticipated when N=1, whereas when N=2, an 87% performance improvement can be expected. Also if similar calculations are made assuming that the data transfer amount at one transfer is 256 KB, then the data transfer rate is obtained as below when the present embodiment is not applied:

$$256 \text{ KB}/(8 \text{ ms}+5.6 \text{ ms})=18.9 \text{ MB/s}$$

When N=1, the data transfer rate is given as follows:

$$256 \text{ KB}/(8 \text{ ms}+(5.6/(2N+1))\text{ms})=26.0 \text{ MB/s}$$

When N=2, the data transfer rate is given as follows:

$$256 \text{ KB}/(8 \text{ ms}+(5.6/(2N+1))\text{ms})=28.1 \text{ MB/s}$$

That is, a 38% performance improvement can be expected when N=1, whereas when N=2, a 49% performance improvement can be expected Incidentally, while the improvement in performance can be anticipated as the value of N increases as in the above-described examples, the degree of improvement in performance is gradually reduced. Increasing the value of N increases the calculation of LBAs of moving destination candidate I frames and the calculation of travel time, and increases a burden on the CPU 41. Therefore, suitable values may preferably be fixed in consideration of these.

Thus, according to the present embodiment, when fast-forward or fast-reverse special reproduction is performed upon reproduction control on motion data recorded on a magnetic disk, a reduction in the transfer rate of data due to a mechanical latency including a rotation latency can be lessened.

Incidentally, while the aforementioned embodiment has described, as an example, the PVR for recording and reproducing the motion data with the magnetic disk as the recording medium, a reproducing or playback device for reading data from various disk-shaped recording mediums such as a DVD or CD on which motion data has optically been recorded, etc. and reproducing it is also capable of performing similar data read control.

Also while the embodiment has described, as an example, the case in which the motion data has been recorded in the MPEG2 scheme, it is needless to say that another motion recording system is also effective in performing similar control where frames are reproduced while skipping them upon fast-forward or fast-reverse special reproduction.

Further, even when access is made to data managed by data blocks of frames or the like, corresponding to voice data, other stream data (sequentially accessed data) as well as the motion data, while skipping some of the data blocks, the present embodiment can be applied as it is.

According to the present invention as described above, when data recorded in a disk shaped recording medium is read, a reduction in the transfer rate of data due to a mechanical latency including a rotation latency of the recording medium can be lessened.

What is claimed is:

1. A content reproducing apparatus for reading and reproducing a digital content that requires sequential reproduction and is recorded in a disk-shaped recording medium in a hard disk drive, comprising:

head position estimating means for estimating a present location of a head with respect to the recording medium for reading a single file of the digital content;

data position calculating means for calculating a location with respect to the recording medium of a data block for a digital content to be read next in chronological sequence in the single file, and chronological sequential positions and locations with respect to the recording medium of other data blocks existing sequentially before and sequentially after the data block in the single file;

the head position estimating means measures a time taken to execute a command for reading the data block and reflects the result of measurement on estimation of the location of the head;

moving destination determining means for determining one of the respective data blocks which the time required to move the head to is the shortest, and that the one of the respective data blocks is to be read next in chronological sequence, based on the present location of the head, which has been estimated by the head position estimating means, and the chronological sequential positions and locations of the respective data blocks, which have been calculated by the data position calculating means; and wherein the moving destination determining means determines, based on a rotation latency necessary for the head to move on a track having predetermined data existing thereon and then for the recording medium to rotate to thereby cause the data to reach the location of the head, a time required to move the head to the chronological sequential position and the location of the one of the respective data blocks.

2. A method of controlling a personal video recorder for reading and reproducing a digital video content recorded in a disk-shaped recording medium in a hard disk drive, comprising:

estimating a present position with respect to the recording medium, of a head for reading the digital video content, wherein a time taken to execute a command for reading the digital video content is measured, and the result of measurement is reflected on estimation of the position of the head:

calculating a position with respect to the recording medium of a data block for the digital video content to be read next, and positions with respect to the recording medium of other data blocks existing sequentially before and sequentially after the data block for rewind and fast operations, respectively, for displaying the digital video content on the personal video recorder;

calculating a time required to move the head to each of the individual respective data blocks, based on the estimated present position of head and the positions with respect to the recording medium of the respective data blocks; and reading one of the respective data blocks at which the calculated time required to move the head to is the shortest.

3. A computer-readable non-transitory recording medium encoded with a software program for controlling a computer and performing control for reading and reproducing a digital video content recorded in a disk-shaped recording medium in a hard disk drive, for allowing the computer to execute the following processes:

a process for estimating a present location with respect to the recording medium, of a head for reading a single file of the digital video content;

a process for calculating chronological sequential positions and locations with respect to the recording medium of a data block for the digital video content to be read next in the single file, and other data blocks existing sequentially before and sequentially after the data block in the single file for rewind and fast operations, respectively;

a process for calculating a time required to move the head to each of the locations of the respective data blocks, based on the estimated present position of the head and the chronological sequential positions and locations of the respective data blocks in the single file; and a process for reading one of the respective data blocks at which the calculated time required to move the head is the shortest.

4. A method of controlling a personal video recorder for reading and reproducing a digital video content recorded in a disk-shaped recording medium in a hard disk drive, comprising:

estimating a present position with respect to the recording medium, of a head for reading the digital video content, wherein a time taken to execute a command for reading the digital video content is measured, and the result of measurement is reflected on estimation of the position of the head;

calculating a first position with respect to the recording medium of a first I frame to be read next, wherein the first I frame is in a first data block and the first I frame is a moving destination for the head;

calculating a second position with respect to the recording medium of a second I frame existing sequentially before the first I frame, wherein the second I frame is in a second data block;

calculating a third position with respect to the recording medium of a third I frame existing sequentially after the first I frame, wherein the third I frame is in a third data block;

calculating a first travel time required to move the head to the first I frame, based on the estimated present position of the head and the first position of the first I frame;

calculating a second travel time required to move the head to the second I frame, based on the estimated present position of the head and the second position of the second I frame;

calculating a third travel time required to move the head to the third I frame, based on the estimated present position of the head and the third position of the third I frame;

determining which of the first travel time, the second travel time, and the third travel time has a smallest travel time;

setting one of the first I frame, the second I frame, and the third I frame as the moving destination of the head, when on the smallest travel time is associated with the one of the first I frame, the second I frame, and the third I frame; and reading data located at the moving destination.

5. The method of claim 4 further comprising:

determining the second I frame existing sequentially before the first I frame; and determining the third I frame existing sequentially after the first I frame.

6. The method of claim 4 further comprising:

detecting a fast-forward reproduction prior to calculating the second position of the second I frame.

7. The method of claim 4 further comprising:

detecting a fast-reverse reproduction prior to calculating the second position of the second I frame.

8. The method of claim 4 wherein the first travel time, the second travel time, and the third travel time are based on a seek time for the head and a rotation latency of the recording medium.

* * * * *